UNITED STATES PATENT OFFICE.

JOHN M. LYMAN, OF CHICAGO, ILLINOIS.

PROCESS OF MAKING LUMP-STARCH.

SPECIFICATION forming part of Letters Patent No. 721,314, dated February 24, 1903.

Application filed August 8, 1902. Serial No. 118,959. (No specimens.)

*To all whom it may concern:*

Be it known that I, JOHN M. LYMAN, a citizen of the United States, residing at Chicago, in the county of Cook and State of Illinois, have invented certain new and useful Improvements in Processes of Making Lump-Starch; and I do declare the following to be a full, clear, and exact description of the invention, such as will enable others skilled in the art to which it appertains to make and use the same.

This invention relates to a certain new and useful improvement in the process employed in making lump-starch, and more particularly to an improved method of making both large and small lump-starch from pulverized starch; and the invention has for its object, among others, the provision of a simple, inexpensive, and efficient process of the character mentioned, by which much larger lumps are produced and a much larger percentage of large lumps than is possible by any of the processes heretofore employed, and at the same time materially lessening the cost of such production.

To these ends and to such others as the invention may pertain the same consists in the novel steps taken in carrying out my process, as will hereinafter be more particularly explained and then specifically defined in the appended claim.

I am aware that it has heretofore been proposed to manufacture lump-starch by compressing the starch when cold, no heat being employed; but it has been found that satisfactory results have not been secured without the use of heat, and I have discovered, as the result of practical experiments in the manufacture of lump-starch, that it is not alone necessary that heat be applied, but that the temperature is required to be properly regulated, and have also found that under no circumstances should the starch be allowed to cool while under pressure.

In carrying out my process I first add moisture to the pulverized starch, either by applying water or steam, until from twenty to twenty-one per cent. of moisture is secured. The starch thus moistened is passed through a centrifugal machine, being forced through a fine-wire meshing, which serves to render the starch fine and to evenly distribute the moisture throughout the mass. After being passed through the wire meshes of the centrifugal machine the starch is heated to a temperature of from 200° to 204° Fahrenheit and is then run into cylinders, the temperature being maintained, and is subjected to a pressure of from fifteen hundred to two thousand pounds to the square inch for a period of from twenty to twenty-four hours. The starch is allowed to remain under pressure only for a sufficient time to allow adhesion to take place, and under no circumstances is it allowed to remain under pressure long enough to permit it to cool, as I have discovered that in case the starch is allowed to cool during the process of making lump-starch it will go through a sweating process, which renders it extremely difficult to dry, and that in drying it will slake or crumble, thus rendering it impossible to make good merchantable lump-starch. After adhesion has taken place the cylinders are opened and the starch is broken into lumps of the size desired, which may be graded, either by breaking-machine, or in case the factory is small the grading may be done by hand. After grading the starch is run into trays and piled in dry-rooms having a uniform temperature of from 90° to 95°, with a circulation of heated air for the purpose of carrying off the moisture. The starch is allowed to remain in the dry-room for two days, when it is in condition for boxing, the starch at that time showing about fourteen per cent. of moisture.

The carrying out of my process, including the time that the starch remains in the drying-room, requires about three days' time.

Having thus described my process, what I claim to be new, and desire to secure by Letters Patent, is—

A process of making lump-starch, consisting in subjecting a mixture of eighty per cent. pulverized starch and twenty per cent. water to the action of a centrifugal machine, and forcing the material through a fine meshing for the purpose of making the starch fine and soft, and thoroughly mixing the same, then heating the moistened starch to a temperature of 200° Fahrenheit, and afterward passing the same into cylinders in which the same high temperature is maintained, and subjecting the cylinders to heavy pressure and allowing the material to remain in the cylinders under pressure in a heated state until adhesion takes place, and afterward subjecting the mixture reduced to lumps to 90° heat Fahrenheit for a period of forty-eight hours, as set forth.

In testimony whereof I hereunto affix my signature in presence of two witnesses.

JOHN M. LYMAN.

Witnesses:
HENRY D. SMALLEY,
JOHN J. CURRAN.